United States Patent Office 3,368,979
Patented Feb. 13, 1968

3,368,979
NUCLEAR FUEL COMPOSITION FOR MULTIPLICATION DETERMINATION IN REACTORS AND DRIVING SUBCRITICAL LATTICES
Maurice A. Robkin, Castro Valley, and Charles R. Porter, Livermore, Calif., assignors to the United States of America as represented by the United States Atomic Energy Commission
No Drawing. Filed May 3, 1967, Ser. No. 637,042
2 Claims. (Cl. 252—301.1)

ABSTRACT OF THE DISCLOSURE

A nuclear fuel composition for improving neutron flux levels and neutron multiplication in a nuclear reactor by uniformly distributing small amounts of californium–252 throughout the fissile fuel material.

Background of the invention

The invention described herein was made in the course of, or under contract No. AT(04–3)–189, Project Agreement No. 38, with the United States Atomic Energy Commission.

This invention relates to nuclear reactors, and in particular to means for increasing neutron flux levels from the fission of fissile material at reactivity levels below the level at which the fission reaction within the core of the reactor is self-sustaining, i.e., critical.

The concept of source neutron multiplication is to introduce neutrons into an assembly or lattice of fuel elements containing a fissile fuel, causing fission reactions to take place which, in turn, produces two to three neutrons for each fission in accordance with well known principles of nuclear physics, multiplying the number of neutrons which may then enter into further reactions. The measurement of neutron multiplication in the past has been primarily for the purpose of assuring that during the start-up of a reactor, or the determination of reactivity of a subcritical lattice, the danger of unexpectedly going critical or supercritical is avoided. The technique used involved the location throughout the core of the reactor of a number of discrete neutron sources, such as an alpha emitter mixed with a light element such as beryllium. The reaction in this case is $_4Be^6 + _2He^4 \rightarrow _6C^{12} + _0n'$. Typical alpha emitters are radium–226, polonium–210, or plutonium–239. In power-generating reactors, Sb-Be sources are often used. Here the reaction involved is Be($\gamma$, n). The difficulty with these types of neutron sources is that they emit neutrons only locally, i.e., from discrete regions, so that care must be taken selecting the control rods to be removed in a large reactor core containing such sources to avoid the possibility of a local self-sustained fission reaction before the entire core becomes critical. The present invention reduces this danger by uniformly distributing neutron-emitting material throughout the fuel. In addition, the popular Sb-Be neutron sources are generally short-lived—with a half-life of 60 days—so that they must be fabricated and used according to a strict time schedule.

Another use of source neutron multiplication is in the determination of various nuclear parameters of experimental reactor core assemblies or lattices. Such core assemblies are generally constructed as reduced scale models of the full-size prototype and often contain substantially less fissile fuel than would constitute a mass capable of a self-sustaining (critical) reaction. With such subcritical lattices, several methods have, in the past, been used for introducing neutrons into the reactor core model in order to achieve an adequate neutron flux.

One method employs as a source of neutrons a full-scale nuclear reactor operating at a substantial power, and having an opening from which neutrons are permitted to stream. The model or subcritical assembly under test is placed to intercept the stream of neutrons and cause multiplication to take place in the lattice. The problem with this method is that the fission reaction distribution is grossly asymmetrical, being biased to the side where the neutrons enter the subcritical assembly. The true performance characteristics of the full-scale assembly cannot be predicted without the introduction of further calculations and determinations of correction factors.

Another method of determining reactor parameters employs a pulsed neutron source which comprises a high energy particle accelerator which causes protons or deuterons to impinge on a deuterium target placed adjacent or within the reactor core. The difficulty with this method, as with the discrete isotopic neutron source previously discussed, is that it is an isolated point source or sources of neutrons and therefore does not simulate the true spatial distribution of fluxes in an operating reactor. Also, the quantity of neutrons produced by these techniques is relatively small.

Summary of the invention

The present invention overcomes many of these problems by employing a commensurate neutron-emitting material having a half-life of only 2.55 years, and with a commensurate high level of neutron output. The amount of this material needed to replace conventional neutron sources, including driving lattices, is small enough to allow mixing the source directly with the reactor or lattice fuel without adversely affecting the nuclear properties of the fuel. It is, therefore, an object of this invention to provide a method for achieving a more linear neutron multiplication rate during the start-up of a nuclear reactor.

It is another object of this invention to provide a method for measuring nuclear operating parameters of a reactor core configuration at reactivity levels below critical.

It is a further object of this ingention to provide a uniformly distributed neutron source within the core of a nuclear reactor.

It is still another object of this invention to provide a method for predicting critical reactivity of a nuclear reactor at reactivity levels substantially below the critical level.

It is another object of this invention to provide a source of neutrons during start-up of a large nuclear reactor which will permit the entire core to become uniformly and measurably critical, requiring only proper control rod removal.

It is another object of this invention to provide a composition of matter usable as a fuel in a nuclear reactor which eliminates the needed for discrete and individual sources of neutrons to assist in initiating the fission reaction.

Other and more particular objects of this invention will be manifest upon a study of the following detailed description.

Description of the preferred embodiment

Basically, the nuclear fuel composition of this invention employs the transuranium isotope californium–252 as a source of neutrons intimately mixed with fissile fuel. The pertinent properties of a few of the transuranium isotopes are listed in Table I.

TABLE I

| Isotope | α Emission Half-life | Spontaneous fission Half-life (yr.) | Curies/gm. | Neutrons/sec.-gm. | Specific power (watts/gm.) |
|---------|----------------------|-------------------------------------|------------|-------------------|----------------------------|
| Pu-238  | 89.6 yr              | 4.9×10^10                           | 16.8       | 2,850             | .555                       |
| Pu-239  | 2.44×10^4 yr         | 5.5×10^15                           | 0.0613     | 0.0294            | 0.00191                    |
| Pu-240  | 6.6×10^3 yr          | 1.3×10^11                           | 0.226      | 935               | 0.00702                    |
| Pu-244  | 7×10^17              | 2.5×10^10                           | 2.09×10^-5 | 5.2×10^3          | 0.000000605                |
| Cf-252  | 2.2 yr               | 66                                  | 645        | 21.03×10^12       | 49                         |

The transuranium isotopes do not occur naturally on earth, and were unknown prior to 1940. They represent a group of man-made elements resulting from neutron capture by the heavy elements beginning with uranium-238 which occurs naturally on earth. The method of producing plutonium-239 from uranium-238 is well known in the art. The method of manufacturing californium-252 from plutonium-239 has only recently been practiced in any quantity. Such methods are described in Nuclear Science and Engineering, volume 17 (1963), pages 435–451. Basically, the technique is to subject the transuranium isotopes to a high intensity neutron flux to achieve multiple neutron captures in a nucleus, successively producing a heavier and heavier atom. Plutonium-239 is bombarded with neutrons to eventually produce plutonium-243, which decays to americium-243. Americium-243 is bombarded with neutrons to produce americium-244 which decays to curium-244. Curium-244 is bombarded with neutrons to eventually produce curium-249, which decays to berkelium-249. Berkelium-249 is bombarded with neutrons to produce berkelium-250 which decays to californium-250. Californium-250 is bombarded with neutrons to eventually produce californium-252.

One of the primary properties of californium-252 and the other transuranium isotopes listed in Table I is their ability to spontaneously fission and produce neutrons. This particular property is used in the present invention to achieve the desirable nuclear characteristics for operating the invention.

It will be noted that the above Table I includes plutonium-238, plutonium-239, plutonium-240, and plutonium-244, which are spontaneously fissionable, and which materials are currently produced in nuclear reactors with high fluxes and whose fuel undergoes high burnup. The use of plutonium-244, for example, as a spontaneous neutron source is possible; however, it would not be applicable to the present invention since it produces so few neutrons as to require 400 million times as much Pu-244 as Cf-252 to produce the same effect. Indeed, Cf-252 is the only isotope which has a favorable combination of (1) sufficiently long half-life (2.2 yr.); (2) sufficient source strength (2×10^12 n/s./g.); and (3) being available in reasonable quantities (1 gram/year in the late 1960's). Californium-252 is also not consumed as a fuel, but rather is lost primarily through spontaneous neutron and alpha emission.

For large nuclear reactors, say in the 1,000 mwe. range, the present invention may be used in place of the usual discrete point sources of neutrons using alpha or gamma emitters as follows: For example, for reactor start-up, to assure that a fission reaction will take place usually one neutron source per 100 mwe. is used, with each source producing 1×10^9 neutrons per second. For a 1,000 mwe. reactor, ten sources are required, producing approximately 1×10^10 neutrons per second. In accordance with Table I, californium-252 produces 2.03×10^12 neutrons per second per gram so that for a 1,000 mwe. reactor, 5×10^-3 grams, or 5 milligrams of californium-252 would be required. This is only ½ of 1% of the current national production rate of Cf-252. In addition, this Cf-252 would be uniformly mixed with the fuel during the fuel manufacture, eliminating the hardware associated with conventional sources. The neutrons produced by the Cf-252 are multiplied in the reactor and provide a flux distribution very closely approximating that produced in the reactor at power.

As an example of the use of the invention to measure the nuclear parameters of a reduced scale model of a nuclear reactor core, suppose the lattice whose parameters are given in Table II contained an amount of Cf-252 distributed throughout the fuel. This lattice is described in USAEC Report GEAP–4690 (Aug. 2, 1965) under Contract No. AT(04–3)–189, Project Agreement No. 38. The lattice is driven by a stream of neutrons emanating from a fission plate coupled to the nuclear test reactor (NTR) situated below the lattice. The flux level obtained in the center of the NTR operating at full power is approximately 10^8 n/cm.^2/sec. To obtain this flux level using Cf-252 neutrons suitably multiplied by the lattice fuel, 50 mg. of Cf-252 would be required. At the end of the measurements program, over 75% of this Cf would be recoverable.

TABLE II

Fuel composition: 97.5% $U^{238}$; 0.7% $U^{235}$; 1.21% $Pu^{239}$; 0.24% $Pu^{240}$; 0.312% $Pu^{241}$; 0.38% $Pu^{242}$ Fuel configuration: 30 mil Zr clad, ½″ dia., 24″ long; water-to-fuel ratio variable from 12:1 to 5:1

Operating conditions ambient to 300° C. at 1050 p.s.i.

A number of substantial advantages would have been incurred had $Cf^{252}$ been mixed in the Project Agreement No. 38 fuel. The following are the major advantages:

(1) The spatial flux distribution would approximate that of a power reactor, enabling meaningful measurements to be made over the entire lattice instead of a small volume at the center.

(2) Expensive and extensive modification to the NTR would have been unnecessary; indeed, the NTR would have been unnecessary and the lattice could have been built at a laboratory not equipped with a nuclear reactor.

(3) Long (several days or week) irradiations at very small cost could be performed allowing more sophisticated and more accurate measurements to be taken. Long irradiations are very costly with the NTR.

(4) The operating safety of the lattice would be greatly increased. This is because an internal neutron monitor could at all times measure the multiplication of the lattice without interference from neutrons originating in the NTR.

In addition, the initial loading of each lattice would have been much easier. The fuel used in the fuel lattice described in GEAP–4690 contained amounts of $Pu^{240}$ and $Pu^{242}$, both of which spontaneously fission. This provided a flux of $10^3$ n/cm.^2/sec. in the center of the fully-loaded lattice. This flux was just adequate for 1/M multiplication plots to be made during loading. The addition of $Cf^{252}$ would give five orders of magnitude greater flux, allowing a more efficient and accurate loading.

It was found that, by using the Pu produced spontaneous fission neutrons in the lattice described in Report GEAP–4690, linear multiplication plots spanning a range of $k=.90$ to $k=.98$ could be produced. Accurate prediction of clean reactivity with as much as $24 in reactivity of poison in the core were made. This is attributed to the uniformity of the in-fuel neutron source. This performance could be obtained in lattices containing only $U^{235}$ and a few micrograms of uniformly distributed $Cf^{252}$.

In general, with respect to subcritical fuel lattices, in order to simulate a full size nuclear reactor core, the quantity of californium-252 must be sufficient in amount and distribution to excite primarily the fundamental mode of the spatial neutron flux distribution.

In the full size reactor core, the spatial neutron flux can be described mathematically as an infinite series of flux patterns superimposed on each other to give an overall general characteristic pattern of neutron flux distribution for that core geometry. Of this infinite number of spatial flux patterns, one is predominant, i.e., fundamental pattern or mode is the one which is present in the critical reactor operating in the steady state. When the full size reactor core is scaled down so that it is subcritical, but has the same geometry as the full size core, it is necessary to maintain the neutron flux by the presence of a separate external neutron source.

The presence of a source or sources discretely located in the core is to introduce into the spatial neutron flux distribution a number of modes other than the fundamental. The uniform distribution of californium-252 reduces the amount of these other modes substantially below the amount of the modes which would be present due to discretely distributed sources.

Althoguh uniform distribution of californium-252 will achieve a great improvement and cause the flux to reproduce the fundamental mode more closely than the core with discrete sources, it is possible to distribute the californium-252 in variable amounts in various locations to achieve a further improvement in the subcritical flux shape and the critical flux shape.

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended claims.

We claim:

1. An improved fuel for a nuclear reactor comprising a fuel material fissionable upon interaction with at least one neutron having the spontaneously fissionable isotope californium-252 uniformly dispersed therethrough in an amount producing at least $1 \times 10^9$ neutrons per second for each 100 mwe. of reactor power.

2. An improved fuel for a nuclear reactor according to claim 1, wherein said fissile material is selected from a group consisting of $U^{235}$, $U^{233}$, $Pu^{239}$, $Pu^{240}$, $Pu^{241}$, $Pu^{242}$.

No references cited.

CARL D. QUARFORTH, *Primary Examiner.*

M. J. SCOLNICK, *Assistant Examiner.*